US012473703B2

(12) United States Patent
Wilson et al.

(10) Patent No.: US 12,473,703 B2
(45) Date of Patent: Nov. 18, 2025

(54) CONVERTIBLE WATER-SIDE ACCESSORY SYSTEM AND DEVICES

(71) Applicant: Goodtimes Products, LLC, Anderson, SC (US)

(72) Inventors: Christopher Robin Wilson, Anderson, SC (US); Stuart Craig Hanson, Anderson, SC (US); Toby Eugene Parker, Anderson, SC (US); Heath Allen Haskett, Anderson, SC (US)

(73) Assignee: GOODTIMES PRODUCTS, LLC, Anderson, SC (US)

( * ) Notice: Subject to any disclaimer, the term of this patent is extended or adjusted under 35 U.S.C. 154(b) by 528 days.

(21) Appl. No.: 18/093,675

(22) Filed: Jan. 5, 2023

(65) Prior Publication Data

US 2024/0229396 A1 Jul. 11, 2024

(51) Int. Cl.

| | |
|---|---|
| ***B63B 29/02*** | (2006.01) |
| ***B63C 3/06*** | (2006.01) |
| ***B63C 3/12*** | (2006.01) |
| ***E02B 3/06*** | (2006.01) |
| ***E06C 9/08*** | (2006.01) |

(52) U.S. Cl.

CPC ................ *E02B 3/064* (2013.01); *B63C 3/06* (2013.01); *B63C 3/12* (2013.01); *E06C 9/08* (2013.01); *B63B 2029/022* (2013.01)

(58) Field of Classification Search

CPC ... E02B 3/064; B63C 3/06; B63C 3/12; E06C 9/08; B63B 2029/022; B63B 27/146; B63B 27/14; B63B 27/143; B63B 2027/148

See application file for complete search history.

(56) References Cited

U.S. PATENT DOCUMENTS

| | | | | |
|---|---|---|---|---|
| 5,579,797 A * | 12/1996 | Rogers | A45B 23/00 135/96 |
| 6,182,598 B1 | 2/2001 | Bozzo | |
| 6,598,562 B1 * | 7/2003 | Dutkiewicz | E06C 1/39 119/706 |
| 6,789,648 B2 | 9/2004 | Cook | |
| 7,017,709 B1 * | 3/2006 | Laymance | E06C 1/36 114/362 |

(Continued)

FOREIGN PATENT DOCUMENTS

DE 2922023 A1 12/1980

*Primary Examiner* — Andrew Polay

(74) *Attorney, Agent, or Firm* — Kirk A. Wilson; Joseph T. Guy; Patent Filing Specialist Inc.

(57) ABSTRACT

Convertible water-side accessory structures and devices make up a system that can be mounted or installed on vehicles, boats, boat docks, or water-side structures in, around, or in close proximity to ponds, lakes, creeks, streams, rivers, natural or man-made pools, oceans, or sea-side applications for recreational, industrial and/or commercial uses at or near the water level including: a water level bench convertible to a dry diving platform, or dry bench, or shelf or other use; a secondary below water footrest/bench when combined with the water level bench, can be converted to a high-level bench, a tabletop, a shelf, dry stow or other uses; a water level ladder convertible to become dry tiered seating, tiered shelving, tiered tabletops or other uses; a water level watercraft support convertible to become a dry diving platform, dry bench, or shelf; and a jib hoist assembly for line attachment to a watercraft.

8 Claims, 12 Drawing Sheets

(56) References Cited

U.S. PATENT DOCUMENTS

| | | | | |
|---|---|---|---|---|
| 7,444,954 | B1 * | 11/2008 | Resta | B63B 27/143<br>114/362 |
| D651,820 | S | 1/2012 | Brown | |
| 8,123,271 | B1 | 2/2012 | Wimberley | |
| 8,720,643 | B1 | 5/2014 | Adair | |
| 8,720,990 | B2 | 5/2014 | Boydston | |
| 9,475,554 | B2 * | 10/2016 | Heimerl | B63B 29/04 |
| 9,592,893 | B2 | 3/2017 | Kroeger et al. | |

* cited by examiner

CONVERTIBLE WATER-SIDE ACCESSORY SYSTEM AND DEVICES

CROSS-REFERENCE TO RELATED APPLICATIONS

None

FIELD OF THE INVENTION

The disclosure relates to convertible dock accessory systems structures and devices used as a utility platform, bench seating, water ladder, and watercraft launch assistance, for single or multiple users, that when combined with a universal mounting post assembly frame, can be mounted or installed on vehicles, boats, boat docks, or water-side structures in, around, or in close proximity to ponds, lakes, creeks, streams, rivers, natural or man-made pools, oceans, or sea-side applications for recreational, industrial and/or commercial uses at or near the water level in a static, fixed, or mobile position. The dock accessories can also be folded, pivoted, tilted, or raised up or away from the water level for storage.

BACKGROUND

Recreational equipment and accessories for water related activities are typically engineered for their narrow purpose of use. Existing benches, ladders and watercraft launches are either fixed at the water level or folded up into a storage position do not provide on deck utility platform(s) for seating or other uses. They also waste deck space and offer limited utility because they either do not fold up or do not provide seating in up positions. Additionally, existing structures do not provide structural armrests, handrails, or frame components that serve as support for deck storage and utility platform(s).

Typical deck ladders are designed specifically for ingress and egress between a body of water and deck surface. Water submersed seating is designed to achieve the singular effect of comfortable seating while wading in water. Deck side furnishing is designed for deck side use. Very little multipurpose convertible equipment exists having multiple functionalities. What remains lacking are devices and equipment that have a cross-over quality, capable of engaging in both above deck and below water activities.

Due to safety concerns, products that encourage extensive use of space along a deck ledge adjacent to a body of water are avoided. Use of this space involves a great deal of protective measures provided by protective equipment or by regulatory means. Devices that encourage activity along a deck ledge involve certain risk and liability. Preference is to limit liability by encouraging and limiting water related risk to normal scope of use within the water environment. As such, this combined use environment has historically been overlooked.

Products that bridge above deck and below water activity and create new convertible cross-over experiences must consider both safety and comfort for the user in these two opposite types of environments. It is not enough to utilize existing devices for either above deck or underwater application. Not only do the alternative environments involve different engineering concerns, but an intermediate environment exists along the location where the dual application device is situated. Therefore, an ideal experience must involve consideration of the above deck, below water and intermediate environments.

SUMMARY OF THE INVENTION

A convertible waterside accessory system is disclosed as having an above water coupling surface disposed proximate a body of water, and at least two mounting post assemblies removably attached to the above water coupling surface. Each mounting post assembly has a vertical mounting post with an upper end, a lower end, a middle section, and a plurality of pivot apertures aligned for accepting a means for attaching an interchangeable accessory. Also, a horizontal leg having a forward end and a rear end with the forward end being attached to the middle section of the vertical mounting post. The horizontal leg extends rearward and is configured for removable attachment to the above water coupling surface. A post handrail is connected between the upper end of the vertical mounting post and the rear end of the horizontal leg. At least one interchangeable accessory is pivotably mounted between at least two mounting posts and is configured for rotation about at least one of a plurality of pivot axes extending between aligned pivot apertures.

Also disclosed in a convertible dock bench accessory, having an interchangeable water level bench pivotably mounted between two mounting post assemblies, the water level bench being configured to pivot about at least one of a plurality of pivot axes extending between aligned pivot apertures in the two mounting post assemblies, thereby converting the dock bench to a dry diving platform supported by a pair of integrated armrests positioned on the sides of the water level bench.

Also disclosed is a convertible dock ladder accessory having an interchangeable dock ladder pivotably mounted between two mounting post assemblies, the dock ladder being configured to pivot about at least one of a plurality of pivot axes extending between aligned pivot apertures in the two mounting post assemblies thereby converting the dock ladder to dry tiered seating, tiered shelving, or tiered tabletops.

Also disclosed is a convertible watercraft support structure accessory, having an interchangeable water level watercraft support structure pivotably mounted between two mounting post assemblies, the watercraft support structure configured to pivot about at least one of a plurality of pivot axes extending between aligned pivot apertures in the two mounting post assemblies thereby converting it to dry watercraft storage.

DETAILED DESCRIPTION

Figure 1:
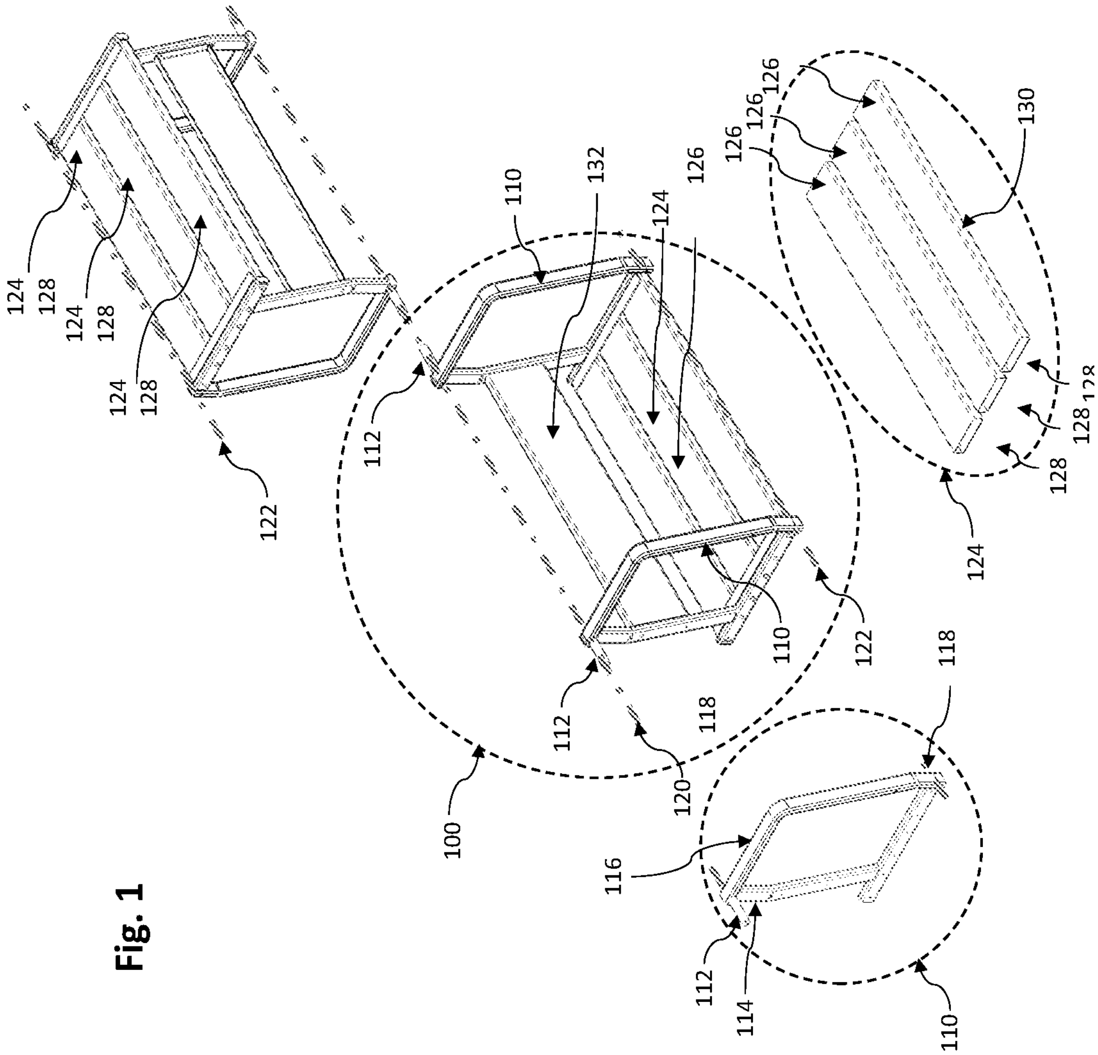
FIG. 1 illustrates a typical bench assembly.

The invention will be described with reference to the figures which are integral, but non-limiting, part of the specification provided for clarity of the invention. Throughout the various figures, similar elements can be numbered consistently.

Unless otherwise stated, the words “about” and “substantially” as used herein are to be construed as meaning the normal measuring and/or fabrication limitations related to the value or condition which the word “about” or “substantially” modifies. Unless expressly stated otherwise, the term “embodiment” is used herein to mean an embodiment of the present invention. Unless expressly stated otherwise, the term ‘up position’ is generally considered a dry position and the term ‘down position’ is generally considered a wet position. The term ‘pin’ or ‘pins’ is considered one of many means for attaching used in mechanically connecting components in every embodiment. Other means for attaching can be ‘pin and bushing’, wherein the bushing extends between all contact surfaces of the pin and the accessory thereby providing vibration damping, spring-buttons or paddle spring clips on the accessory and/or the mounting post assemblies, as well as any marine mechanical connector suitable for water-side use. Other vibration damping devices such as washers, grommets, spacers, and corrosion-resistant dry-running sleeve bearings may be used in the means for attaching. The means for attaching can also include a rod positioned along one of the pivot axes and extending full length between two or more mounting post assemblies, thereby configured to pivotably mount accessories of different width between the two or more mounting post assemblies, as well as accepting multiple accessories on a single rod. The rod position can be secured with lynch pins or similar retaining devices.

A convertible waterside accessory system is disclosed as having an above water coupling surface on a vehicle, watercraft, boat dock, and other water-side structures. The coupling surface is disposed proximate a body of water, such as a pond, lake, creek, stream, river, natural or man-made pool, and ocean. At least two mounting post assemblies are removably attached to the above water coupling surface. Multiple mounting post assemblies can be ganged together or separately mounted to the coupling surface to house multiple interchangeable accessories. Each mounting post assembly can have a vertical mounting post with an upper end, lower end, middle section, and a plurality of pivot apertures aligned for docking an interchangeable accessory. A horizontal leg has a forward end and a rear end, the forward end being attached to the middle section of the vertical mounting post. The horizontal leg extends rearward and is configured for removable attachment to the above water coupling surface. A post handrail is connected between the upper end of the vertical mounting post and the rear end of the horizontal leg, in an ‘L’-shaped pattern. At least one interchangeable accessory is pivotably mounted between each of at least two mounting posts and configured for rotation about at least one of a plurality of pivot axes extending between aligned pivot apertures in the vertical mounting posts. Pivoting motion converts each of the accessories safely from above deck use to below water use, as well as intermediate environment use such as in stowage.

Another embodiment is a utility platform or bench seating for single or multiple users that when combined with a universal mounting frame can be mounted or installed on vehicles, boats, boat docks, or water-side structures in, around, or in close proximity to ponds, lakes, creeks, streams, rivers, natural or man-made pools, oceans, or sea-side applications for recreational, industrial and/or commercial uses at or near the water level in a static, fixed, or mobile position that can also be folded, pivoted, tilted, or raised up or away from the water level for storage and use as a utility platform or seating for single or multiple users.

Another embodiment is a water ladder that when combined with a universal mounting frame can be mounted or installed on vehicles, boats, boat docks, or water-side structures in, around, or in close proximity to ponds, lakes, creeks, streams, rivers, natural or man-made pools, oceans, or sea-side applications for recreational, industrial and/or commercial uses at or near the water level in a static, fixed, or mobile position that can also be folded, pivoted, tilted, or raised up or away from the water level for storage and use as a utility platform(s) or stadium style seating for single or multiple users.

Yet another embodiment is a water level watercraft launch assist that when combined with a universal mounting frame can be mounted or installed on vehicles, boats, boat docks, or water-side structures in, around, or in close proximity to ponds, lakes, creeks, streams, rivers, natural or man-made pools, oceans, or sea-side applications for recreational, industrial and/or commercial uses at or near the water level in a static, fixed, or mobile position that can also be folded, pivoted, tilted, or raised up or away from the water level for storage and use as a utility platform or seating for single or multiple users.

Users can use the bench, ladder and watercraft launch at lake level and/or on the dock deck for recreation or other purposes. The multiple-use/position bench, ladder and watercraft launch conserves deck space. Accessing the bench, ladder and watercraft launch is made safer and easier due to built-in structure that serves as armrests or handrails at water level and utility platform support in the up position. The universal mounting frames provide additional safety handrail for descending from the deck down onto bench, ladder and watercraft launch.

Disclosed herein are structures that can be mounted or installed on vehicles, boats, boat docks, or water-side structures in, around, or in close proximity to ponds, lakes, creeks, streams, rivers, natural or man-made pools, oceans, or sea-side applications for recreational, industrial and/or commercial uses at or near the water level including: a water level bench when combined with a mounting frame can be pivoted around a strategically located axis to change uses to become a dry diving platform, or dry bench, or shelf or other use, supported by the armrests of the water level bench; a secondary below water footrest/bench when combined with the water level bench, can be pivoted around a strategically located axis to change uses to a high level bench, or a tabletop, or shelf, or dry stow or other uses, supported and locked into the water bench; a water level ladder when combined with a mounting frame can be pivoted around a strategically located axis to change uses to become a dry tiered seating or tiered shelving or tiered tabletops or other uses stored and supported by the handrails locking into the mounting frame; a water level watercraft support when combined with a mounting frame can be pivoted around a strategically located axis to become a dry diving platform, or dry bench, or shelf or other use, supported by adjustable legs on the watercraft support.

Figure 2:
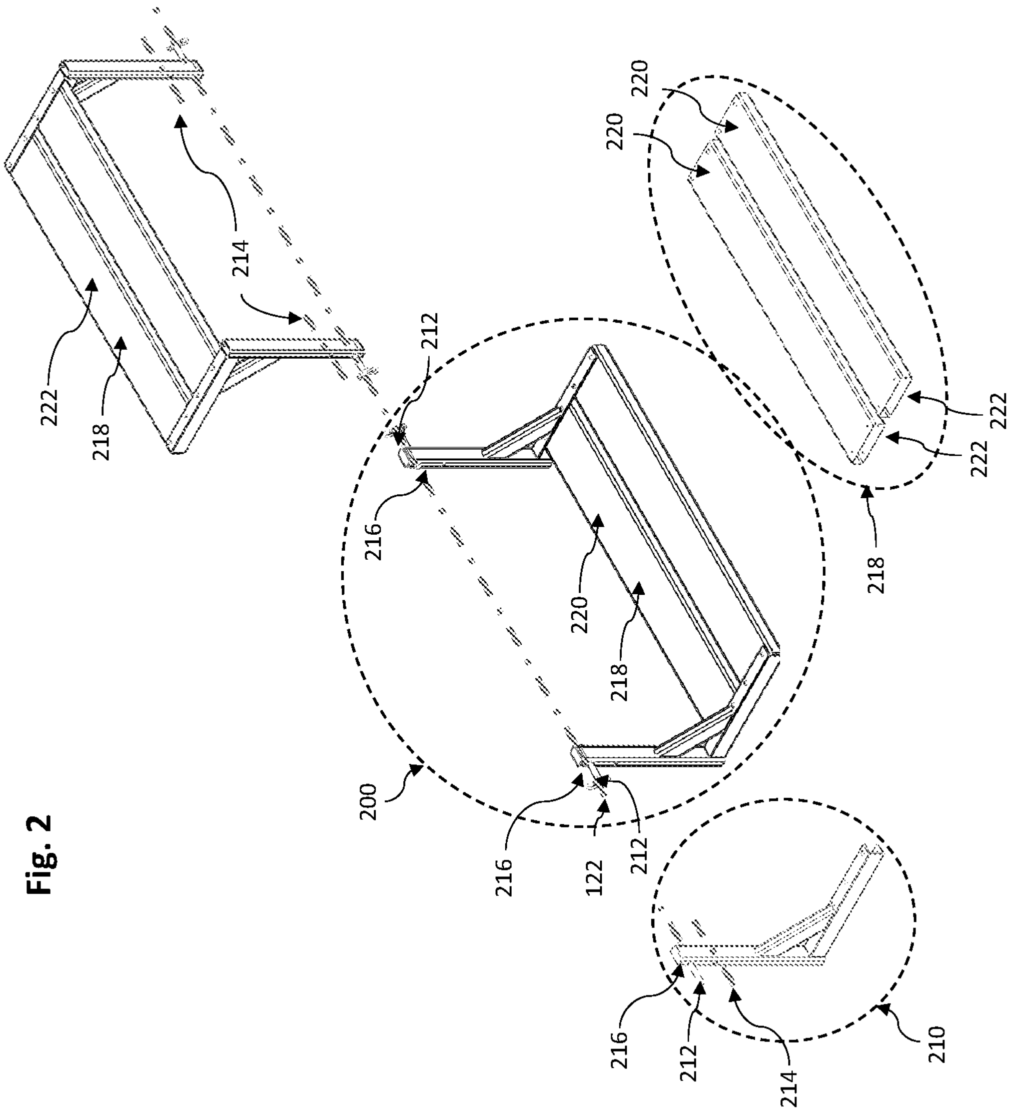
FIG. 2 illustrates a typical secondary below water footrest.

Referring to FIG. 1, a convertible dock bench assembly accessory 100 is shown positioned along a pivot axis 120 in both the up (dry) position and down (wet) position. Bench pivot axis pins 112, such as a hitch pin secured with a lynch pin, can provide attachment means for the accessory 100. Two bench armrests 110, located along each side of the frame, provide armrest function in the 'wet' water level bench down position, and leg support when pivoted and converted a dry diving platform, dry bench, or shelf in the up position. Along pivot axis 122, lower bench pivot axis pins 212 can secure a secondary below water footrest 200, as seen in FIG. 2, extending from the water level bench which can be pivoted and converted to a high-level bench, tabletop, shelf, or dry stow in the up position.

Figure 3:
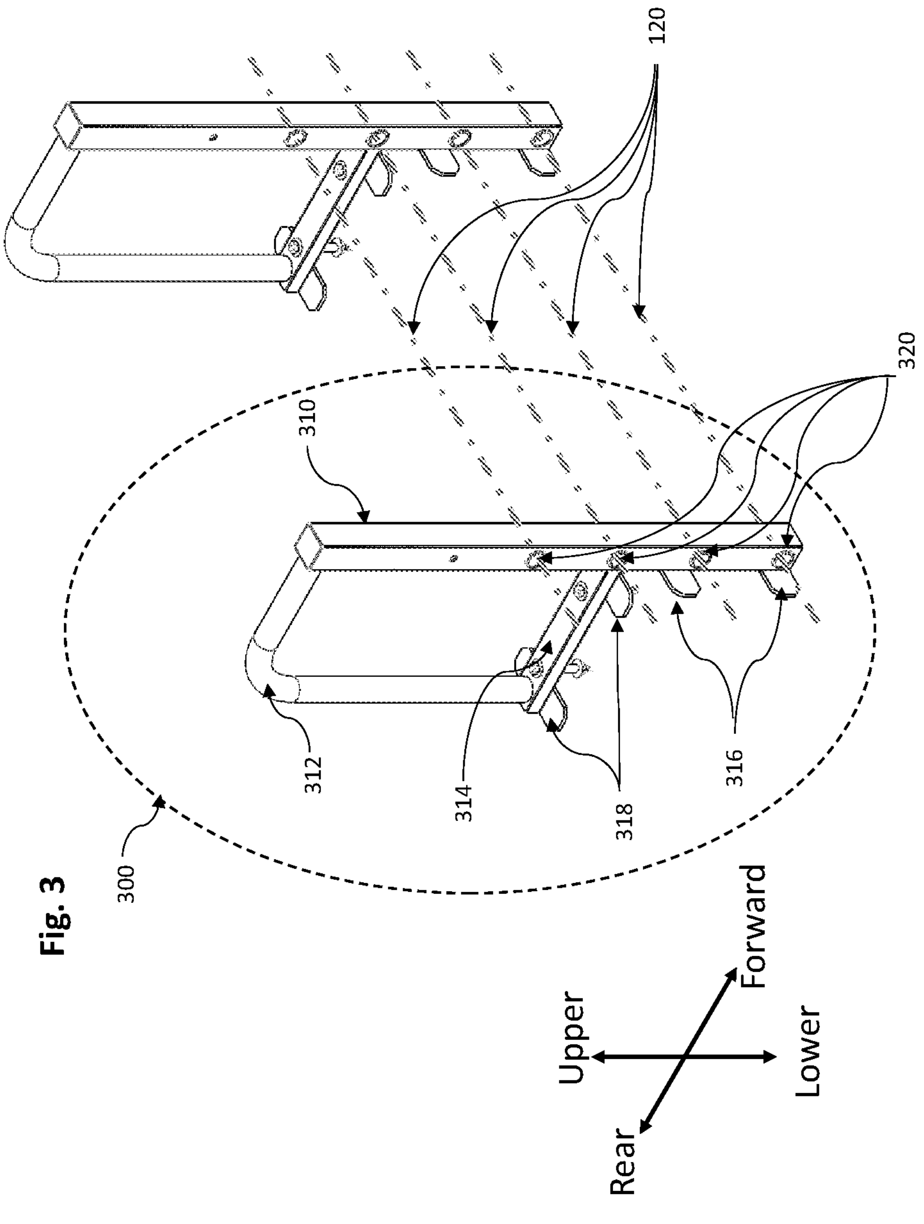
FIG. 3 illustrates a typical mounting post assembly.

Referring to FIG. 3, a pair of mounting post assemblies 300 can be removably attached to an above water coupling surface 610. Each mounting post assembly has a vertical mounting post 310 having an upper end, a lower end, a middle section, and a plurality of pivot apertures 320 aligned for docking an interchangeable accessory 100, 400, 500. A horizontal leg 314, having a forward end and a rear end, wherein the forward end is attached to the middle section of the vertical mounting post 310, extends rearward for removable attachment to the above water coupling surface 610. A post handrail 312 is connected between the upper end of the vertical mounting post 310 and the rear end of the horizontal leg 314, in a general 'L' shape, to provide handrail function during use. At least one interchangeable accessory 100, 400, 500 can be pivotably mounted between the at least two mounting posts 300 and configured for rotation or pivoting about at least one of a plurality of pivot axes 120 extending between aligned pivot apertures 320.

Figure 4:
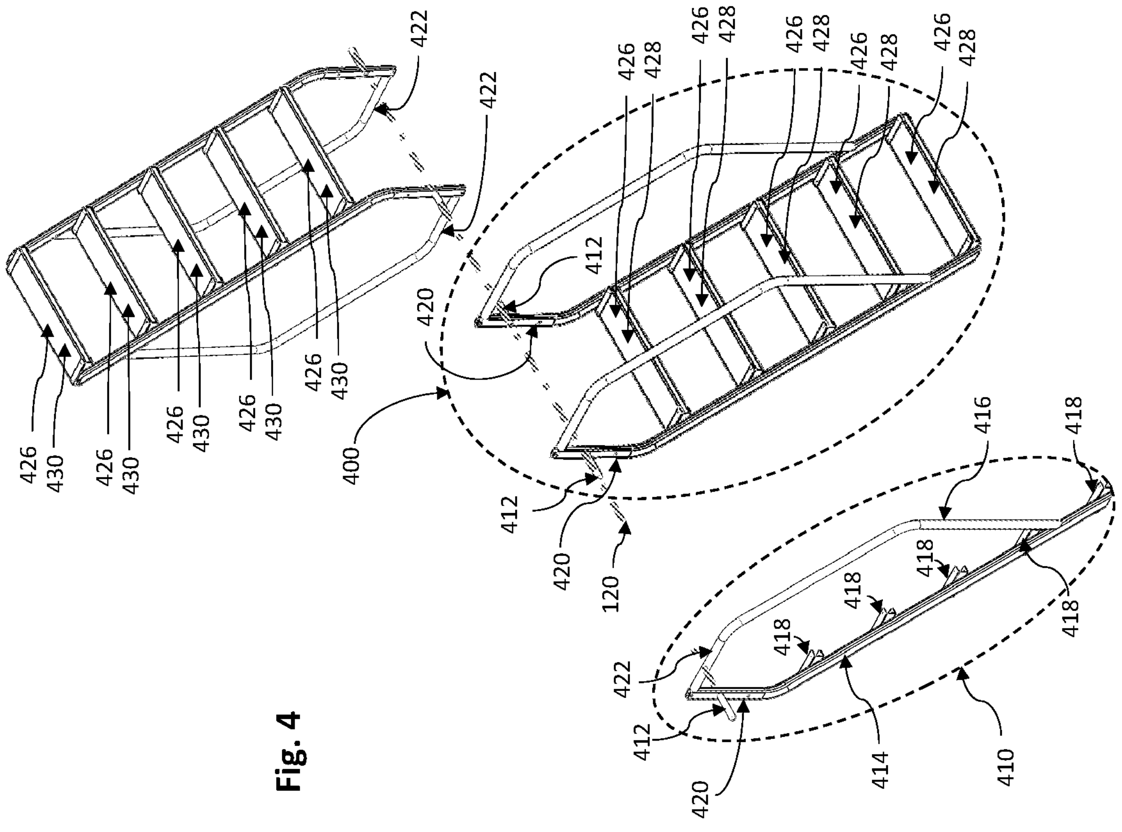
FIG. 4 illustrates a typical dock ladder assembly.

Referring to FIG. 4, a convertible dock ladder accessory 400, is shown positioned along a pivot axis 120 in both the up position and down position. Ladder pivot axis pins 412, such as a hitch pin secured with a lynch pin, can provide attachment means for the ladder accessory 400. Two ladder handrails 416, located along each side of the ladder frame, provide handrail function in the 'wet' water level access down position, and standing leg support when pivoted and converted to dry tiered seating, tiered shelving, or tiered tabletops in the up position.

Figure 5:
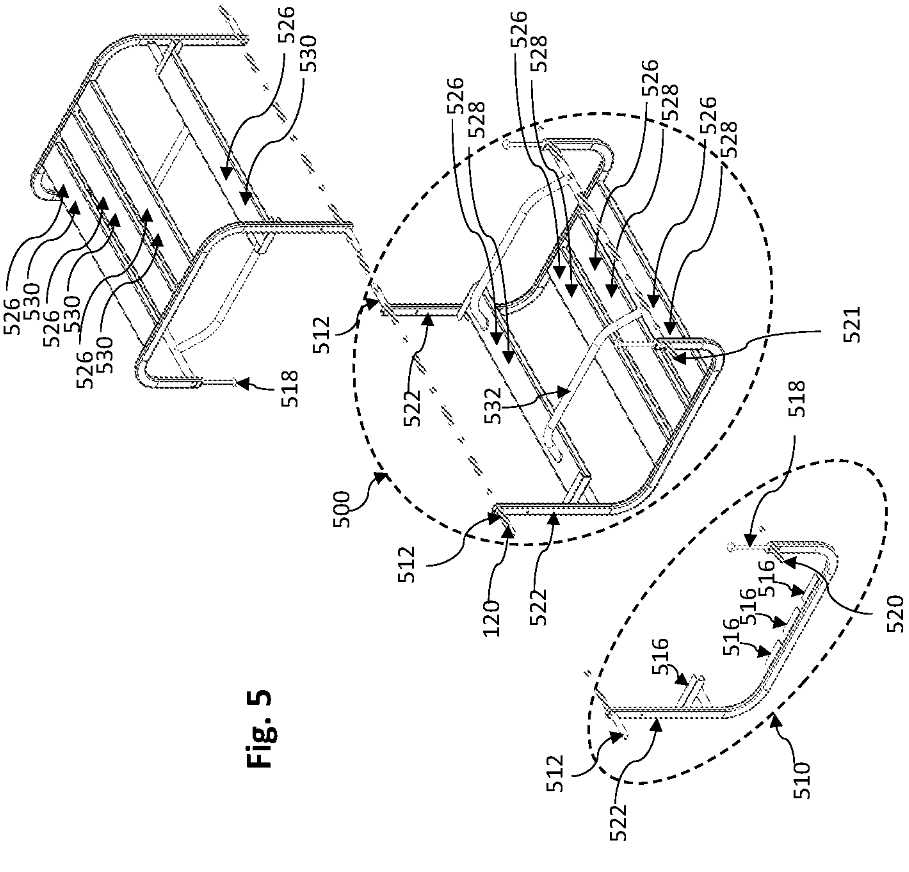
FIG. 5 illustrates a typical watercraft support assembly.

Referring to FIG. 5, a convertible watercraft support structure accessory 500 is shown positioned along a pivot axis 120 in both the up (dry) position and down (wet) position. Watercraft support frame pivot axis pins 512, such as a hitch pin secured with a lynch pin, can provide attachment means for the watercraft support frame accessory 500. The convertible watercraft support structure accessory 500 can be pivotably mounted between two mounting post assemblies 300, and configured to pivot about at least one of a plurality of pivot axes 120 extending between aligned pivot apertures in the two mounting post assemblies 300 thereby converting to dry watercraft storage.

Figure 6:
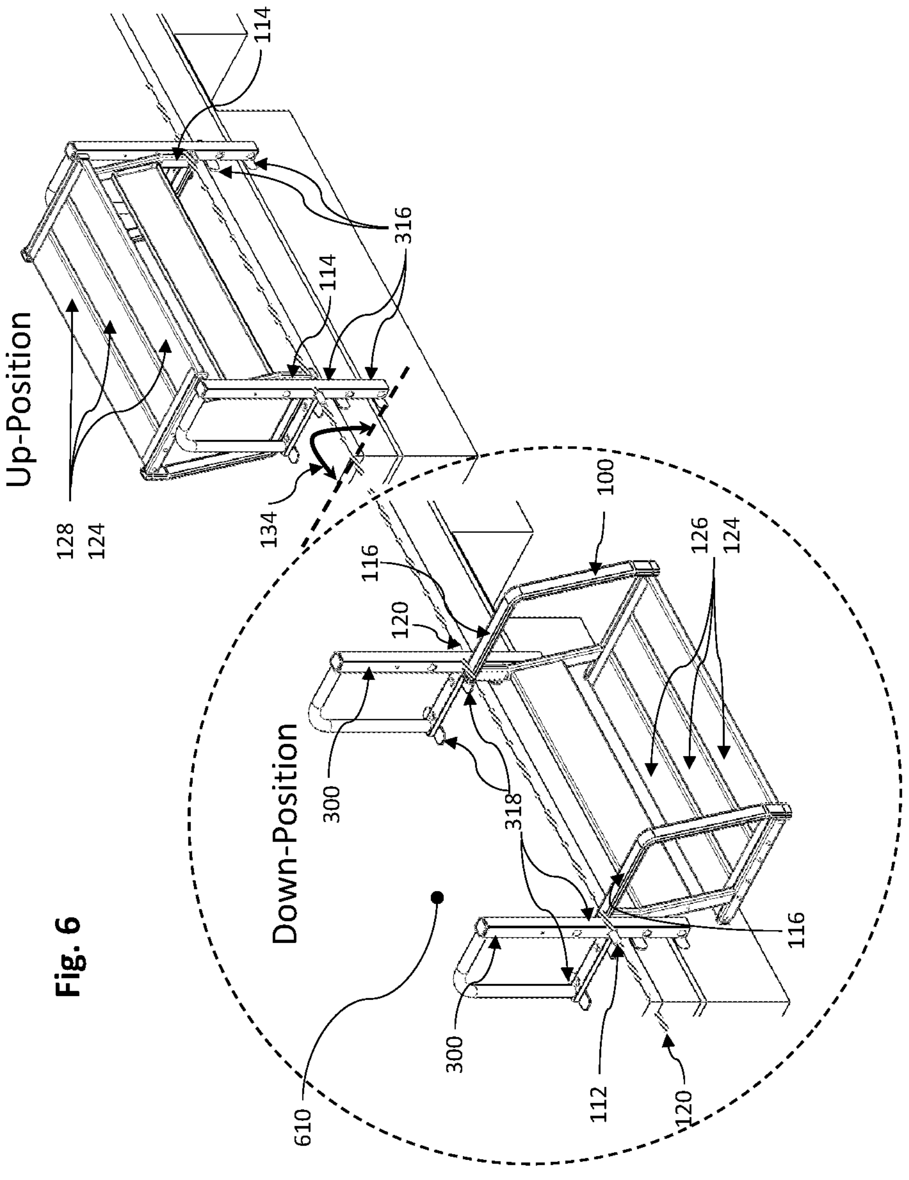
FIG. 6 illustrates a typical up and down position of a bench assembly.

Referring to FIG. 6, two mounting post assemblies 300 are shown generally as attached to an above water coupling surface 610, such as a dock or a boat deck. A bench assembly 100 is attached and supported vertically between the two mounting post assemblies 300 along the pivot axis 120 with the bench pivot axis pins 112 and rotated to the down-position until the bench down-position stop surface 114 bears against the mounting posts down-position rotation stops 316 and the bench seat slat top surface 126 is facing upward. The bench assembly 100 can be rotated to the up-position until the bench armrests 116 bear against the mounting post up-position rotation stops 318 and the bench seat slat bottom surface 128 is facing upward. The rotation stops 316, 318 can have an irregular shaped profile such that rotating or moving the mounted position of each stop provides pivot angle 134 adjustment for the interchangeable accessory, thereby providing increased comfort and functionality. The rotation stops 316, 318 can also be padded for additional comfort and functionality.

Figure 7:
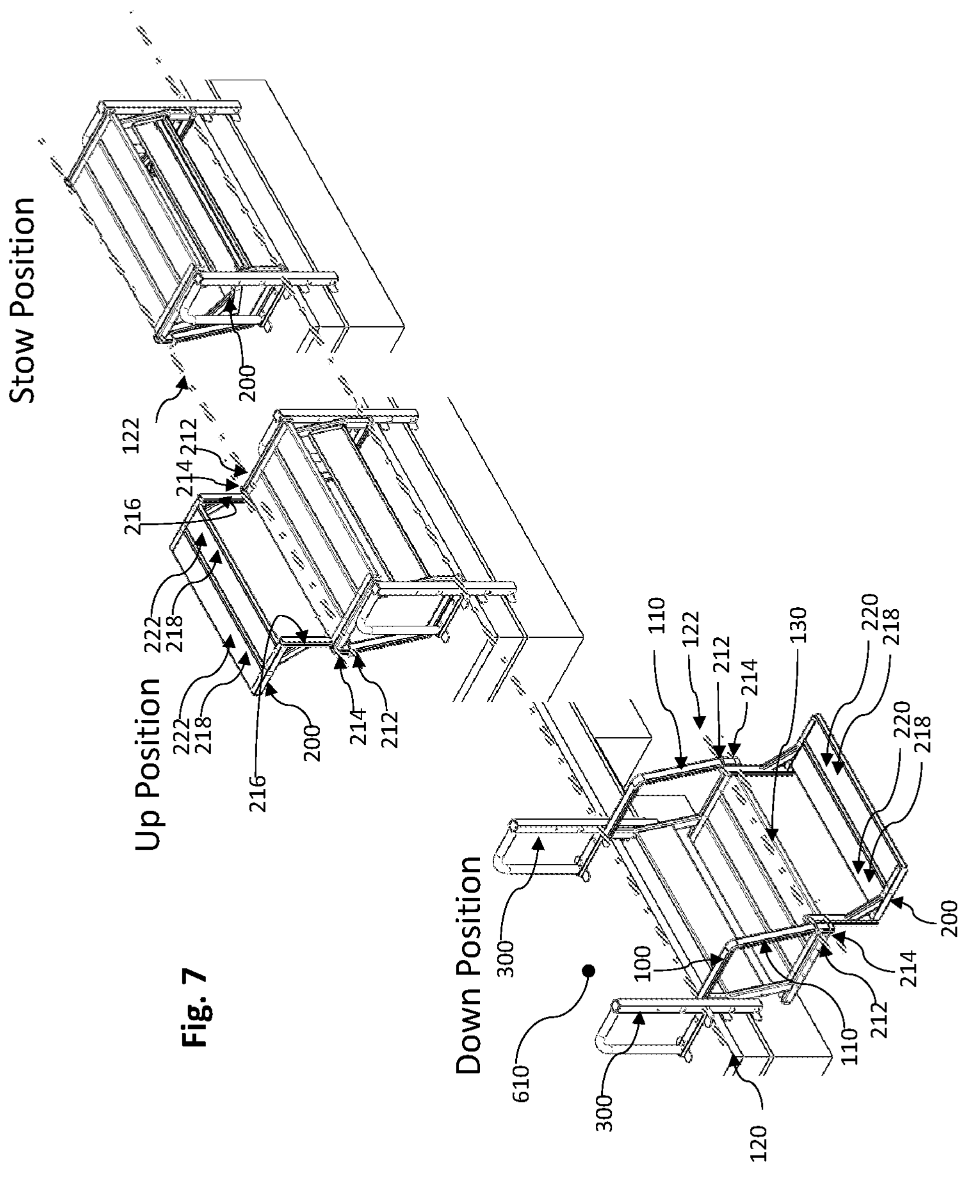
FIG. 7 illustrates a typical up and down position and stow position of a secondary below water footrest.

Referring now to FIG. 7, two mounting post assemblies are shown generally as 300 attached to an above water coupling surface 610, such as a deck. A bench assembly 100 is attached and supported vertically between the two mounting post assemblies 300 along the pivot axis 120 with the bench pivot axis pins 112 and rotated to the down-position until the bench down-position stop surface 114 bears against the mounting posts down-position rotation stops 316 and the bench seat slat top surface 126 is facing upward.

A lower bench assembly 200 is shown generally attached and supported vertically between the two bench armrests 110 along the pivot axis 122 with the lower bench pivot axis pins 212 and rotated to the down-position until the lower bench down-position stop surface 216 bears against the bench seat slat lower bench stop surface 130 and the lower bench seat slat top surface 220 is facing upward and locked into position with a lower bench up-position stop pin 214.

The bench assembly 100 with the lower bench assembly 200 attached can be rotated to the up-position until the bench armrests 116 bear against the mounting post down-position rotation stops 318 and the lower bench seat slat bottom surface 222 is facing upward. The lower bench up-position stop pin 214 can be removed and the lower bench assembly 200 rotated down for stow.

Figure 8:
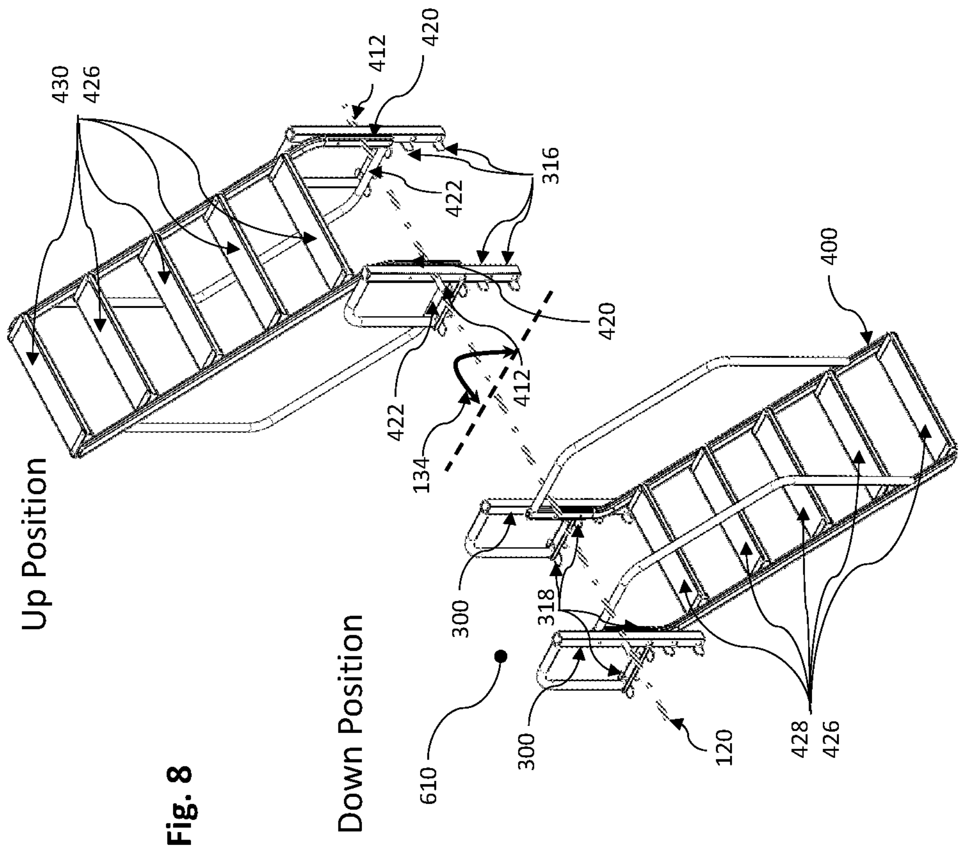
FIG. 8 illustrates a typical up and down position of a dock ladder.

Referring now to FIG. 8, two mounting post assemblies are shown generally as 300 attached to an above water coupling surface 610, such as a deck. A ladder assembly 400 is attached and supported vertically between the two mounting post assemblies 300 along the pivot axis 120 with the ladder frame pivot axis pins 412 and rotated to the down-position until the ladder down-position stop surface 420 bears against the mounting post down-position rotation stops 316 and the step seat slat top surface 428 is facing upward.

The ladder assembly 400 can be rotated to the up-position until the ladder up-position handrail stop surface 422 bears against the mounting posts up-position rotation stops 318 and the step seat slat bottom surface 430 is facing upward. The rotation stops 316, 318 can have an irregular shaped profile such that rotating or moving the mounted position of each stop provides pivot angle 134 adjustment for the interchangeable accessory, thereby providing increased comfort and functionality.

Figure 9:
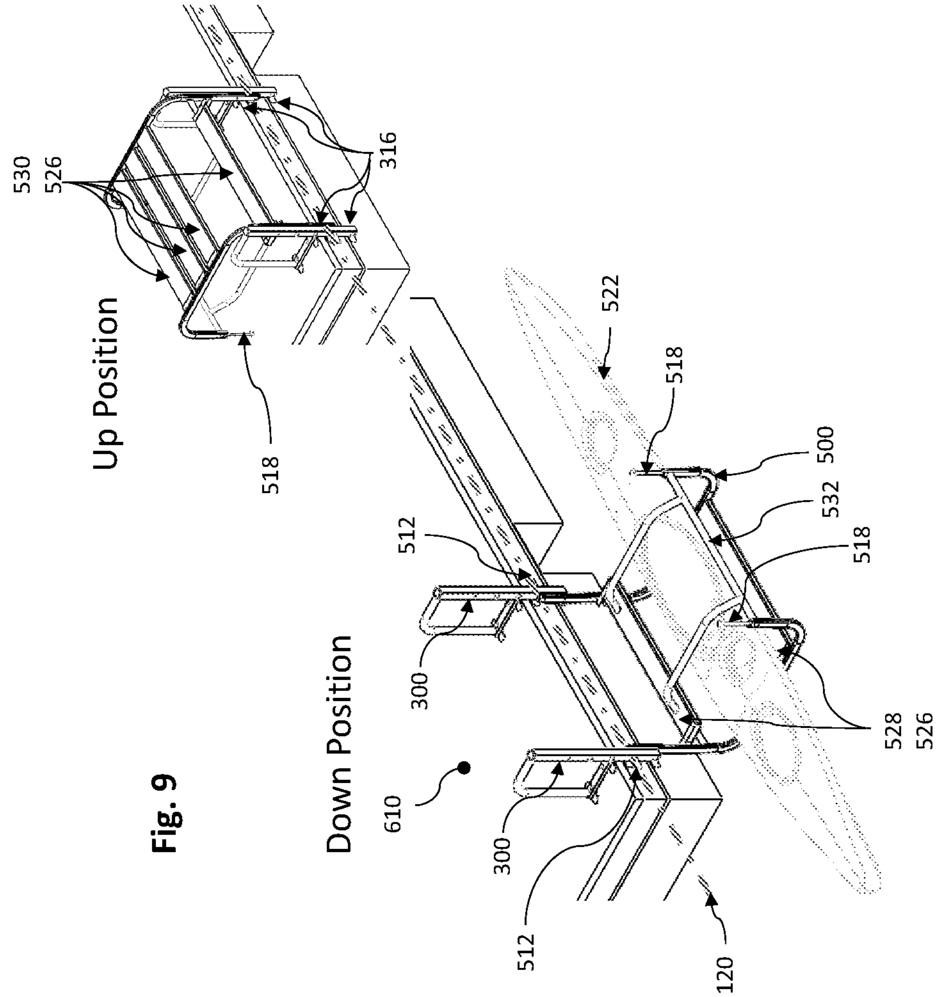
FIG. 9 illustrates a typical up and down position of a watercraft support assembly.

Referring to FIG. 9, two mounting post assemblies are shown generally as 300 attached to an above water coupling surface 610, such as a deck. A watercraft support assembly 500 is attached and supported vertically between the two mounting post assemblies 300 along a pivot axis 120 with the watercraft support frame pivot axis pins 512 and rotated to the down-position until the watercraft support down-position stop surface 522 bears against the mounting post down-position rotation stops 316 and the step seat slat top surface 528 is facing upward.

A watercraft support rotating handrail 532 can be attached and supported vertically along the watercraft support handrail pivot axis 521 through the watercraft support handrail pivot apertures 520.

The watercraft support assembly 500 can be rotated to the up-position until the watercraft support adjustable leg up-position support 522 bears against the deck 610 and the step seat slat bottom surface 530 is facing upward.

Figure 10:
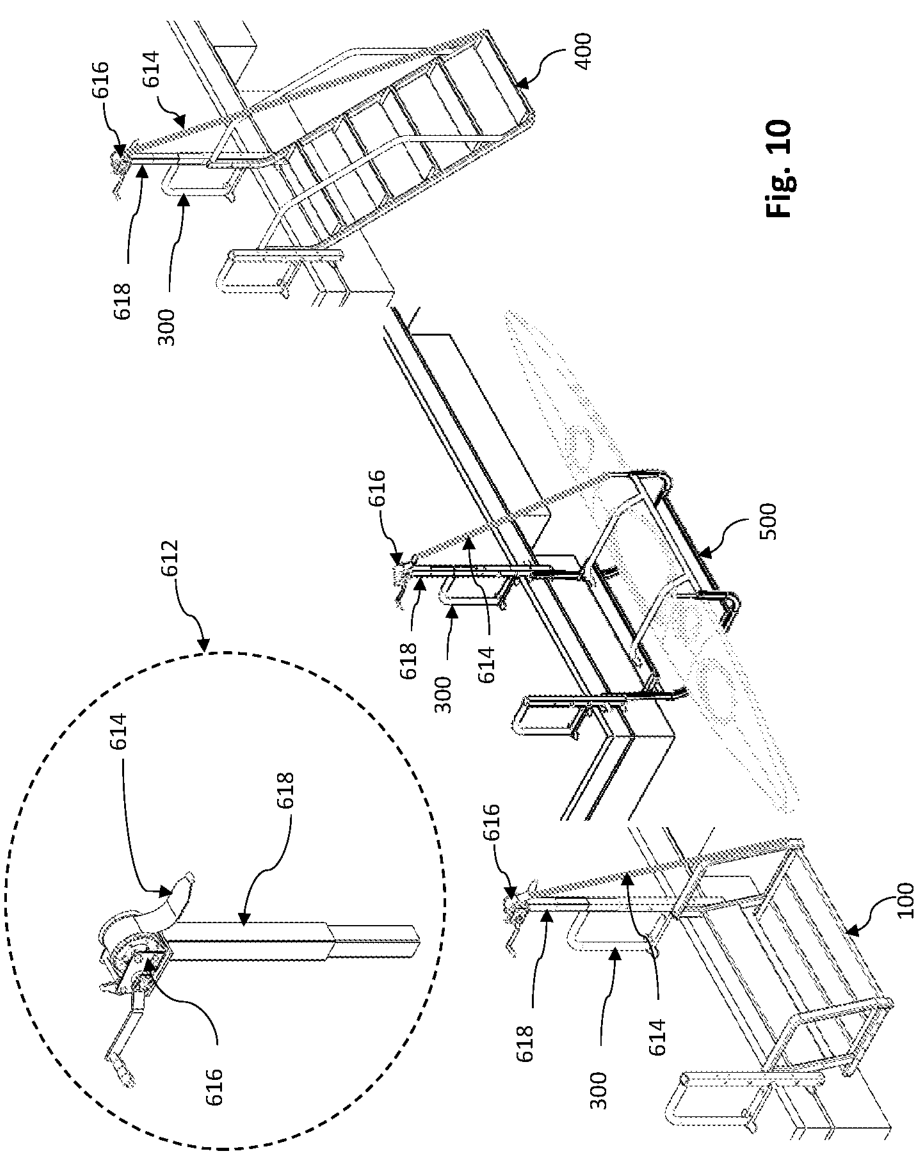
FIG. 10 illustrates a typical mounting post extension assembly.

Referring to FIG. 10, the assemblies of FIG. 6, FIG. 8, and FIG. 9 are shown generally as mounted on an above water coupling surface 610, such as a deck and in the down position. A mounting post extension 618 can be attached to a mounting post assembly 300. A ratcheting mechanism 616 or other pulling device can be attached to a mounting post assembly 300 or a mounting post extension 618.

A strap, chain or cord 614 can be attached to a bench assembly 100 and or a ladder assembly 400 and or a watercraft support assembly 500 on one end and attached to a ratcheting mechanism 614 on opposite end to pull and rotate assemblies from the down position to the up position.

Figure 11:
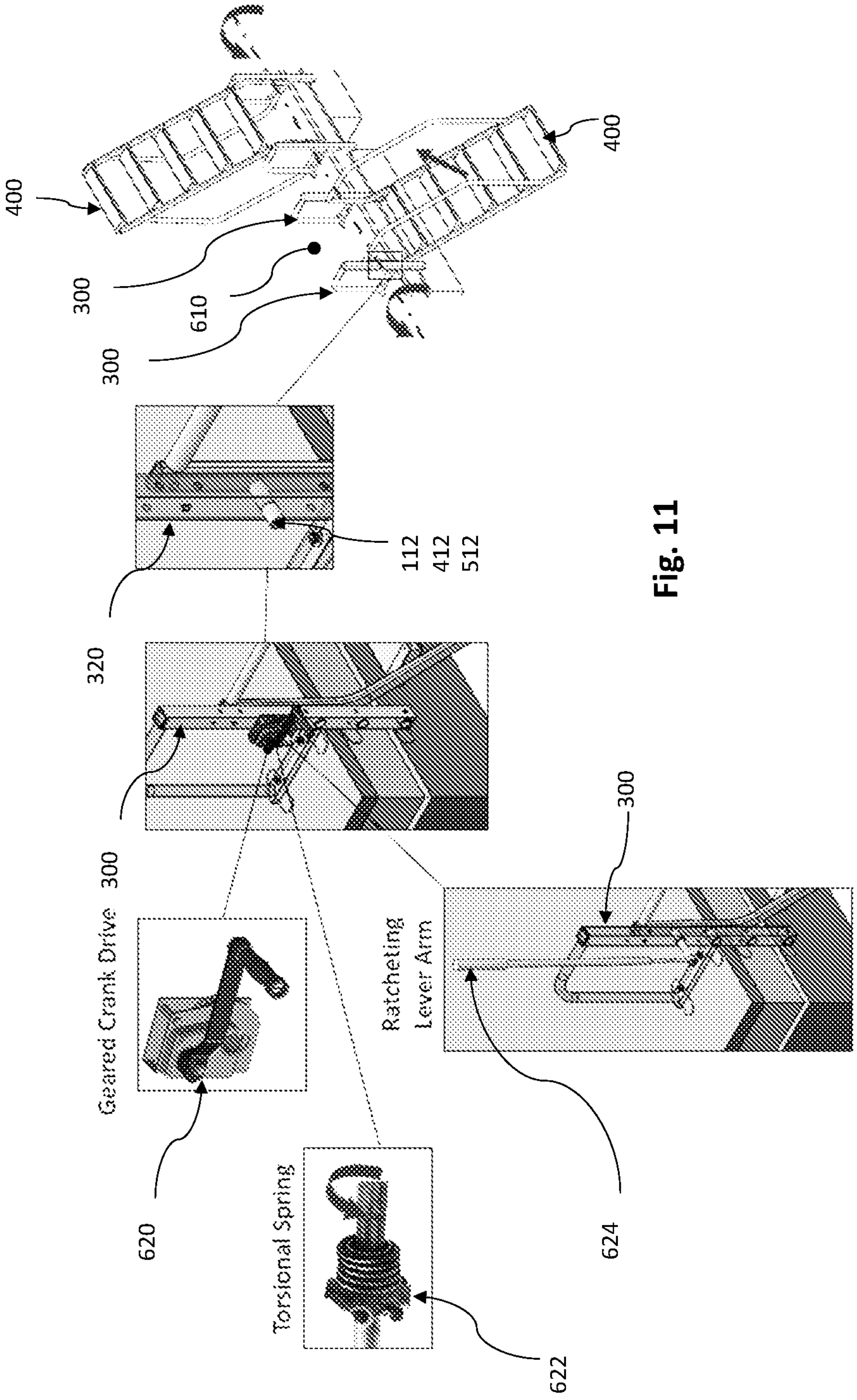
FIG. 11 illustrates a typical components of a mounting post extension assembly.

Referring to FIG. 11, the assembly of FIG. 8 is shown generally as mounted to an above water coupling surface 610, such as a deck, and in the down position and up position. A bench pivot axis pin 112 or a ladder frame pivot axis pin 412 or a watercraft support frame pivot axis pin 512 is shown extending through a mounting post pivot aperture 320. A geared crank drive 620 can be attached to the extruding end of the bench pivot axis pin 112 or a ladder frame pivot axis pin 412 or a watercraft support frame pivot axis pin 512 and to the mounting post assembly 300. A torsional spring 622 can be attached to the extruding end of the bench pivot axis pin 112 or a ladder frame pivot axis pin 412 or a watercraft support frame pivot axis pin 512 and to the mounting post assembly 300. A ratcheting lever arm 624 can be attached to the extruding end of the bench pivot axis pin 112 or a ladder frame pivot axis pin 412 or a watercraft support frame pivot axis pin 512. Each mounting post extension can have at least one of a winch, a pull cord, a torsional spring 622, a counter-balance, a coil spring, a geared crank 620, a ratcheting lever arm 624, or similar mechanical lift devices.

Figure 12:
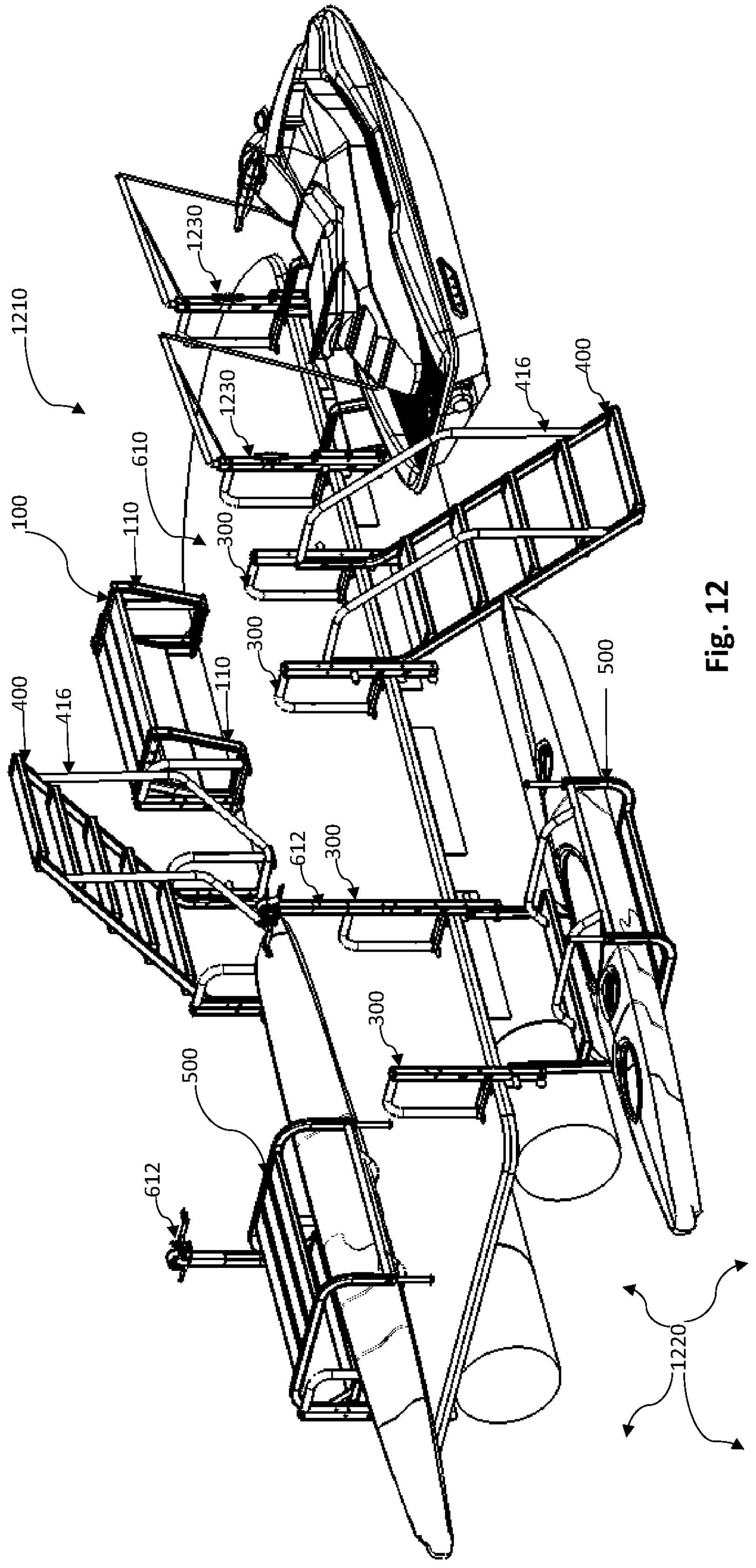
FIG. 12 illustrates a typical convertible waterside accessory system having multiple accessories positioned in up position and down position.

Referring to FIG. 12, a perspective view of a typical convertible waterside accessory system 1210 in a body of water 1220, as having multiple interchangeable accessories 100, 400, 500 mounted to mounting post assemblies 300, in both up and down positions, that are removably secured to an above water coupling surface 610.

The above water coupling surface 610, as shown, is a deck of a pontoon boat positioned in the body of water 1220. A jib hoist assembly 1230 can be used to tie-off to a dock and/or lift a watercraft, such as a jet ski, for securement or dry storage. The jib hoist assembly 1230 can be operated from a winching device, such as a geared crank drive 620.

The invention has been described with reference to preferred embodiments without limit thereto. One of skill in the art would realize additional embodiments which are described and set forth in the claims appended hereto.

The invention claimed is:

1. A convertible waterside accessory system, comprising:

an above water coupling surface disposed proximate a body of water, at least two mounting post assemblies removably attached to the above water coupling surface, each mounting post assembly comprising;

a vertical mounting post comprising an upper end, a lower end, a middle section, and a plurality of pivot apertures aligned for accepting a means for attaching at least one interchangeable accessory, a horizontal leg comprising a forward end and a rear end, the forward end attached to the middle section of the vertical mounting post, the horizontal leg extending rearward and configured for removable attachment to the above water coupling surface, and a post handrail connected between the upper end of the vertical mounting post and the rear end of the horizontal leg, wherein the at least one interchangeable accessory is pivotably mounted between the at least two mounting post assemblies and configured for rotation about at least one of a plurality of pivot axes extending between aligned pivot apertures.

2. The convertible waterside accessory system of claim 1, wherein the above water coupling surface further comprises at least one of a vehicle, watercraft deck, boat dock, and water-side structures.

3. The convertible waterside accessory system of claim 1, wherein the body of water comprises at least one of a pond, lake, creek, stream, river, natural or man-made pool, and ocean.

4. The convertible waterside accessory system of claim 1, wherein the interchangeable accessory comprises at least one of:

a water level bench convertible to a dry diving platform, dry bench, or shelf;

a secondary below water footrest extending from the water level bench convertible to a high-level bench, tabletop, shelf, or dry stow;

a water level ladder convertible to dry tiered seating, tiered shelving, or tiered tabletops;

a water level watercraft support convertible to a dry diving platform, dry bench, or shelf; and a jib hoist assembly for line attachment to a watercraft.

5. The convertible waterside accessory system of claim 1, wherein the at least two mounting post assemblies further comprise a plurality of rotation stops, adjustable to define a pivot angle for each interchangeable accessory.

6. The convertible waterside accessory system of claim 5, wherein the plurality of rotation stops comprise an irregular shaped profile such that a mounted position of each stop provides pivot angle adjustment.

7. The convertible waterside accessory system of claim 1, further comprising at least one mounting post extension assembly configured to assist in pivoting motion of the at least one interchangeable accessory.

8. The convertible waterside accessory system of claim 7, wherein the at least one mounting post extension further comprises at least one of a winch, a pull cord, a torsional assist, a counter-balance, a coil spring, a geared crank, and a ratcheting lever arm.

* * * * *